(12) United States Patent
Maurer

(10) Patent No.: US 8,485,590 B2
(45) Date of Patent: Jul. 16, 2013

(54) COCKPIT SUPPORT STRUCTURE OF A MOTOR VEHICLE

(75) Inventor: Steffen Maurer, Freudental (DE)

(73) Assignee: Dr. Ing H. C. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/548,491

(22) Filed: Jul. 13, 2012

(65) Prior Publication Data

US 2013/0026798 A1 Jan. 31, 2013

(30) Foreign Application Priority Data

Jul. 28, 2011 (DE) .................... 10 2011 052 250

(51) Int. Cl.
*B62D 21/00* (2006.01)
(52) U.S. Cl.
USPC .................... 296/193.02; 296/72
(58) Field of Classification Search
USPC ............................ 296/193.02, 72
See application file for complete search history.

(56) References Cited

U.S. PATENT DOCUMENTS

| | | | |
|---|---|---|---|
| 6,391,470 B1 * | 5/2002 | Schmieder et al. | 428/598 |
| 6,869,123 B2 * | 3/2005 | Marks et al. | 296/70 |
| 7,216,927 B2 * | 5/2007 | Luo et al. | 296/193.02 |
| 7,891,707 B2 * | 2/2011 | Kuwano | 280/779 |
| 8,029,045 B2 * | 10/2011 | Merkle et al. | 296/193.02 |

FOREIGN PATENT DOCUMENTS

| | | |
|---|---|---|
| DE | 100 26 981 | 12/2001 |
| DE | 100 57 181 | 5/2002 |
| EP | 0 990 578 | 4/2000 |
| EP | 1 655 208 | 5/2006 |
| EP | 2 137 051 | 12/2009 |

* cited by examiner

*Primary Examiner* — Joseph Pape
(74) *Attorney, Agent, or Firm* — Gerald E. Hespos; Michael J. Porco; Matthew T. Hespos

(57) ABSTRACT

A cockpit support structure of a motor vehicle has a cross member (11) with brackets (13, 14, 15, 16, 17) for connecting the cross member (11) to a body structure of the motor vehicle, and having brackets (18, 19, 20) for connecting functional components to the cross member (11). The cross member (11) and the brackets (13, 14, 15, 16, 17, 18, 19, 20) all are produced from a magnesium alloy material.

6 Claims, 1 Drawing Sheet

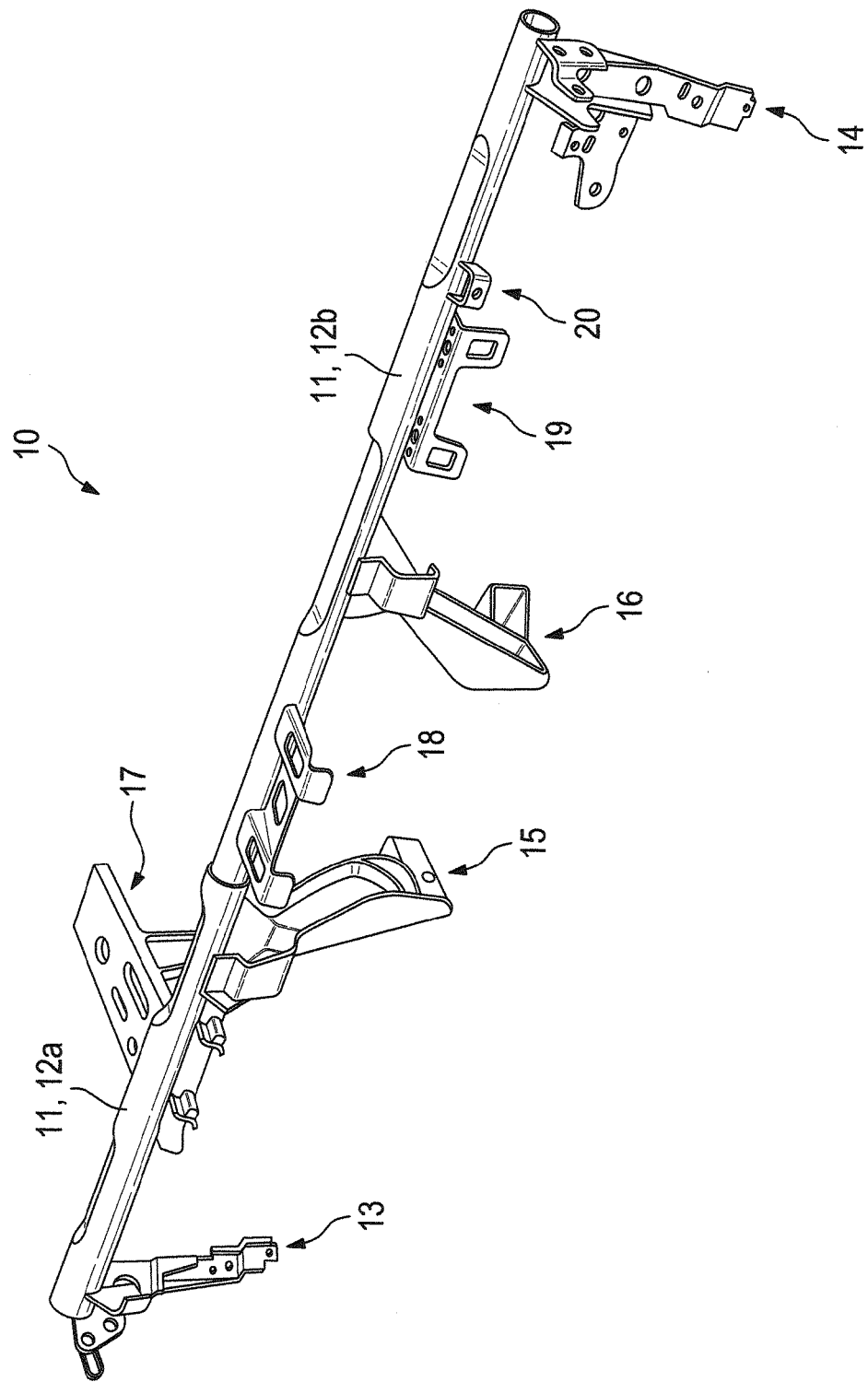

COCKPIT SUPPORT STRUCTURE OF A MOTOR VEHICLE

CROSS REFERENCE TO RELATED APPLICATION

This application claims priority under 35 USC 119 to German Patent Appl. No. 10 2011 052 250.6 filed on Jul. 28, 2011, the entire disclosure of which is incorporated herein by reference.

BACKGROUND OF THE INVENTION

1. Field of the Invention

The invention relates to a cockpit support structure of a motor vehicle.

2. Description of the Related Art

EP 0 990 578 B1 discloses a cockpit structure of a motor vehicle having a cross member with a plurality of brackets. The cross member of the cockpit support structure of EP 0 990 578 B1 has two profile portions that can be displaced relative to one another as viewed in the longitudinal direction. Brackets are connected to the cross member. Specifically, side brackets enable the cross member to be connected to A pillars of the body structure, central brackets enable the cross member to be connected to a tunnel of the body structure, brackets enable a passenger airbag to be fastened, and brackets enable a steering device of the motor vehicle to be fastened. The individual assemblies of the cockpit support structure of EP 0 990 578 B1 are produced from a metallic material, for example a light metal such as aluminum.

The object of the invention to provide a novel cockpit support structure of a motor vehicle.

SUMMARY OF THE INVENTION

The invention relates to a cockpit support structure with a cross member and brackets. All of the components of the cockpit support structure, specifically the cross member and the brackets, are produced from a magnesium alloy, thereby reducing the weight of the cockpit support structure as compared to the cockpit support structures known from the prior art.

The cross member preferably has at least two tubular profiles that engage into one another in a telescopic manner or which are telescopically displaceable with respect to one another. The tubular profiles preferably are formed as extruded profiles from a first magnesium alloy. Brackets for connecting the cross member to the body structure preferably are formed as cast components from a second magnesium alloy. Brackets for connecting the cross member to a passenger airbag and/or to a glove compartment and/or to an instrument panel cover preferably are formed as sheet-metal components from a third magnesium alloy.

Formation of the components of the cockpit support structure as extruded profiles, cast components and sheet-metal components allows for minimal weight while adopting individual components of the cockpit support structure optimally to the tasks they perform. Components that connect the cross member to the body structure of the motor vehicle are formed as magnesium alloy cast components to provide the required connection and integration points while having a low weight. Components of the cockpit support structure for connection of the passenger airbag, the glove compartment and/or of the instrument panel cover are formed as magnesium alloy sheet-metal components to permit simple adaptability to the functional component to be fastened.

The profiles of the cross member preferably are welded to one another to fix their relative position, while the brackets are connected to the cross member by cold joining. The welding of the profiles of the cross member to fix their relative telescopic position is preferable for strength reasons. The connection of the brackets to the cross member by cold joining can reduce to an absolute minimum any distortion of the cockpit support structure that may arise in the case of hot joining. Warm joining is also possible.

Exemplary embodiments of the invention will be explained in more detail on the basis of the drawing, without the invention being restricted to the exemplary embodiment.

BRIEF DESCRIPTION OF THE DRAWINGS

FIG. 1 is a schematic illustration of a cockpit support structure of a motor vehicle.

DETAILED DESCRIPTION OF THE PREFERRED EMBODIMENT

FIG. 1 shows a schematic perspective view of a cockpit support structure 10 according to the invention.

A cockpit support structure in accordance with the invention is identified by the numeral 10 in FIG. 1. The cockpit support structure 10 has a cross member 11 formed by profiles 12a, 12b that engage into one another in a telescopic manner. In the exemplary embodiment, the cross member 11 has two tubular profiles 12a and 12b that engage into one another and that are telescopically displaceable in their axial direction before the assembly of the cockpit support structure in the motor vehicle to adapt the cockpit support structure to different widths of a motor vehicle. The tubular profile 12b engages into the tubular profile 12a has a smaller diameter and preferably is assigned to the passenger side of the cockpit support structure. In those portions in which the tubular profiles 12a, 12b engage into one another, an outer diameter of a driver-side profile 12a corresponds to an outer diameter of a passenger-side profile 12b.

The cockpit support structure 10 has brackets 13, 14, 15 and 16 that connect the cross member 11 to a body structure of the motor vehicle. Two lateral brackets 13 and 14 connect the cross member 11 of the cockpit support structure 10 to A pillars of the body structure. Central brackets 15 and 16 connect the cross member 11 to a tunnel of the body structure.

The cockpit support structure comprises a further bracket 17 that connects the cross member 11 to a windshield cowl or to a bulkhead of the body structure. The bracket 17 also functions to connect the steering column system of the motor vehicle to the cross member 11.

The cockpit support structure 10 has further brackets 18, 19 and 20 to connect functional components to the cross member 11. The bracket 18 connects an instrument panel cover of the vehicle cockpit to the cross member 11. The bracket 19 connects a glove compartment to the cross member 11. The bracket 20 connects a passenger airbag to the cross member 11 of the cockpit support structure 10.

The cross member 11 and the brackets 13 to 20 are produced from a magnesium alloy material so that the cockpit support structure 10 has a low weight.

The two tubular profiles 12a, 12b of the cross member 11 are produced as extruded profiles from a first magnesium alloy material. More particularly, the tubular profiles 12a, 12b of the cross member 11 preferably are extruded from the magnesium alloy AZ31 or MgAl3Zn1.

The brackets 13, 14, 15, 16 and 17 that connect the cross member 11 to the body structure of the motor vehicle preferably are cast from a second magnesium alloy, and preferably the magnesium alloy material AM50 or MgAl5Mn.

The brackets 18, 19 and 20 that function to connect functional components, such as the passenger airbag, the glove compartment and/or the instrument panel cover preferably are sheet-metal components formed from a third magnesium alloy, and preferably the magnesium alloy AZ31B or MgAl3Zn1.

All of the components of the cockpit support structure accordingly are produced from magnesium alloys. The tubular profiles of the cross member 11 preferably are extruded profiles produced from the first magnesium alloy. The brackets that connect the cross member 11 to the body structure and if appropriate that connect further components to the cross member 11 are cast components produced from a second magnesium alloy. The brackets 18, 19 and 20 for connecting functional components to the cross member 11 are sheet-metal components produced from a third magnesium alloy.

All of the modules or assemblies of the modular cockpit support structure of the invention are produced from a magnesium alloy.

The cockpit support structure 10 can be adapted to the width of the motor vehicle by telescopic axial displacement of the tubular profiles 12a and 12b that engage into one another. The two profiles 12a and 12b that are in the desired relative position are connected to one another preferably by welding.

The brackets 13, 14, 15, 16 and 17 that connect the cross member 11 to the body are connected to the cross member 11 by cold joining, in particular by adhesive bonding and additional mechanical fixing, for example by riveting.

Opposite end of the brackets 13, 14, 15, 16 and 17 preferably are screwed to the respective portion of the body structure.

The brackets 18, 19 and 20 preferably also are connected to the cross member 11 and to the respective functional component to be connected to the cross member 11 by cold joining, namely by adhesive bonding, and additional mechanical fixing on the side of the cross member 11, and by screws on the side of the respective functional component.

If only the tubular profiles 12a and 12b of the cross member 11 are connected by welding and all of the brackets 13 to 20 of the cockpit support structure 10 are connected to the cross member 11 by cold joining, it is possible for distortion to arise in the cross member 11 in the case of warm joining, in particular in the case of welding, to be reduced to an absolute minimum.

The cockpit support structure according to the invention has a low weight and can be adapted in a simple manner to different motor vehicle types.

The cockpit support structure can be adapted to different widths of a motor vehicle by axial displacement of the tubular profiles 12a and 12b of the cross member 11. The variable connection of the brackets to the cross member 11 enables the cockpit support structure 10 to be adapted simply to left-hand and right-hand-drive vehicles.

Formation of the individual components or modules of the cockpit support structure as extruded profiles, cast components or sheet-metal components enables the individual modules of the cockpit support structure 10 to be adapted individually to the task they must perform. In this way, it is possible to ensure adequate stability of the cockpit support structure while maintaining as low a weight as possible while providing a corresponding number of connection points and integration points.

What is claimed is:

1. A cockpit support structure of a motor vehicle, comprising:
a cross member with at least first and second tubular profiles extruded from a first magnesium alloy, the tubular profiles being telescoped with one another and welded together at a telescoped position to achieve a specified length for the cross member;
first brackets having a cold joining connection to the cross member and configured for connecting the cross member to a body structure of the motor vehicle, the first brackets being cast from a second magnesium alloy different than the first magnesium alloy of the tubular profiles; and
second brackets having a cold joining connection to the cross member and configured for connecting functional components to the cross member, the second brackets being formed from sheets of a third magnesium alloy different than the first and second magnesium alloys of the tubular profiles and the first brackets.

2. The cockpit support structure of claim 1, wherein the first brackets comprise first and second lateral brackets connecting the cross member to A pillars of the body structure and first and second central brackets connecting the cross member to a tunnel of the body structure.

3. The cockpit support structure of claim 1, wherein the second brackets connect the cross member to a passenger airbag, to a glove compartment, and to an instrument panel cover.

4. The cockpit support structure of claim 1, wherein the first and second brackets are screwed to the body structure of the motor vehicle and to the passenger airbag, to the glove compartment, and to the instrument panel cover.

5. The cockpit support structure of claim 1, wherein the cold joining connection of the first and second brackets to the cross member comprises at least one of an adhesive connection and a mechanical affixation.

6. The cockpit support structure of claim 1, wherein the first brackets comprise at least two first brackets connected to each of the tubular profiles.

* * * * *